United States Patent
Jeannerot et al.

(10) Patent No.: US 11,111,835 B2
(45) Date of Patent: Sep. 7, 2021

(54) INJECTOR FOR INJECTING A GASEOUS REDUCING AGENT INTO AN EXHAUST GAS STREAM, COMPRISING AT LEAST ONE ANTI-BACKFLOW DEVICE

(71) Applicant: FAURECIA SYSTEMES D'ECHAPPEMENT, Nanterre (FR)

(72) Inventors: Thibaut Jeannerot, La Planee (FR); James Holloway, Soeborg (DK); Jorn Hansen, Soeborg (DK); Ludovic Geant, Rioz (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 16/662,174

(22) Filed: Oct. 24, 2019

(65) Prior Publication Data
US 2020/0131966 A1 Apr. 30, 2020

(30) Foreign Application Priority Data
Oct. 26, 2018 (FR) .................................. 18 59921

(51) Int. Cl.
*F01N 3/20* (2006.01)
*B01F 3/04* (2006.01)
(Continued)

(52) U.S. Cl.
CPC ........ *F01N 3/2066* (2013.01); *B01F 3/04049* (2013.01); *B01F 5/0471* (2013.01);
(Continued)

(58) Field of Classification Search
CPC ............... F01N 3/2066; F01N 2610/02; F01N 2610/105; F01N 2610/1453;
(Continued)

(56) References Cited

U.S. PATENT DOCUMENTS

| 2008/0022663 A1* | 1/2008 | Dodge | F01N 3/2066 60/286 |
| 2010/0064670 A1* | 3/2010 | Starck | F16L 11/121 60/295 |

(Continued)

FOREIGN PATENT DOCUMENTS

| DE | 102009013260 A1 | 9/2010 |
| EP | 2573348 A1 | 3/2013 |

(Continued)

OTHER PUBLICATIONS

French Search Report for French Application No. 18 59921, dated Apr. 5, 2019.

*Primary Examiner* — Audrey B Walter
*Assistant Examiner* — Edward Bushard
(74) *Attorney, Agent, or Firm* — Carlson, Gaskey & Olds, P.C.

(57) ABSTRACT

An injector comprises at least one injection nozzle, a dosing system to provide a dosed flow of reducing agent to the at least one or each injection nozzle, and an injection line fluidically connecting the dosing system to the at least one or each injection nozzle. The injection line comprises an upstream pipe fluidically connected to the dosing system, at least one downstream pipe fluidically connected to a respective injection nozzle, and at least one anti-backflow device to avoid or minimize fluidic flow from the at least one or each downstream pipe toward the upstream pipe.

18 Claims, 5 Drawing Sheets

(51) Int. Cl.
*B01F 5/04* (2006.01)
*F16K 15/04* (2006.01)

(52) U.S. Cl.
CPC .... *F01N 2610/02* (2013.01); *F01N 2610/105* (2013.01); *F01N 2610/1453* (2013.01); *F01N 2610/1486* (2013.01); *F16K 15/044* (2013.01)

(58) Field of Classification Search
CPC ......... F01N 2610/1486; F01N 2610/06; F01N 2610/10; F01N 2610/14; F01N 3/206; F01N 3/2892; F01N 2610/1446; F01N 2240/20; B01F 3/04049; B01F 5/0471; F16K 15/044; Y02A 50/20; Y02T 10/12
See application file for complete search history.

(56) References Cited

U.S. PATENT DOCUMENTS

| | | | |
|---|---|---|---|
| 2013/0098006 A1* | 4/2013 | Brueck | F01N 3/2066 60/295 |
| 2013/0199157 A1 | 8/2013 | Henry et al. | |
| 2014/0041729 A1 | 2/2014 | Lacouture et al. | |

FOREIGN PATENT DOCUMENTS

| | | |
|---|---|---|
| FR | 2957630 A1 | 9/2011 |
| FR | 2974849 A1 | 11/2012 |
| FR | 2994455 A1 | 2/2014 |
| WO | 2013072982 A1 | 5/2013 |

* cited by examiner

INJECTOR FOR INJECTING A GASEOUS REDUCING AGENT INTO AN EXHAUST GAS STREAM, COMPRISING AT LEAST ONE ANTI-BACKFLOW DEVICE

CROSS-REFERENCE TO RELATED APPLICATIONS

This application is a U.S. non-provisional application claiming the benefit of French Application No. 18 59921, filed on Oct. 26, 2018, which is incorporated herein by its entirety.

TECHNICAL FIELD

The present invention concerns an injector for injecting a reducing agent into the exhaust gas stream of an internal combustion engine, the injector being of the type comprising at least one injection nozzle, a dosing system for providing a dosed flow of reducing agent to the or each injection nozzle, and an injection line fluidically connecting the dosing system to the or each injection nozzle.

The invention further concerns an exhaust line for an internal combustion engine comprising such an injector, and an automotive vehicle comprising such an exhaust line.

The gaseous reducing agent comprises, for example, ammonia, a mix of air with ammonia, or a mix of ammonia and neutral gas such as helium.

BACKGROUND

The internal combustion engines of automotive vehicles are known for producing nitrogen oxides also referred to as "NOx". These can be a significant source of air pollution as they contribute to the formation of smog and acid rain, and affect tropospheric ozone. Thus, it is desirable to eliminate NOx contained in the exhaust gas of these engines.

To that end, a method has been developed that is known as "Selective Reduction Catalyst" (SCR), wherein ammonia is used for reducing NOx into harmless nitrogen. This method comprises injecting a reducing agent into the exhaust gas stream and using an injector of the above-mentioned type. The reducing agent is then mixed with the exhaust gas and reduces the NOx into nitrogen when the exhaust gas stream flows through a SCR catalyst.

Commonly, the reducing agent comprises a liquid urea agent that is first subjected to thermal-hydrolysis as it mixes with the exhaust gas. This thermal-hydrolysis transforms the liquid urea agent into ammonia before the mix of exhaust gas and ammonia goes through the SCR catalyst.

This however is not very effective.

It has been found out that it is much more effective to inject ammonia directly into the exhaust line, upstream of the SCR catalyst, rather than the above-mentioned liquid urea agent. This way, the first step mentioned above is eliminated.

This observation has led to the development of injectors for injecting gaseous ammonia into the exhaust gas stream, such injectors being known for instance from FR 2 994 455. These injectors are usually used in replacement of the injectors of liquid urea agent.

However, these known injectors are not entirely satisfactory. Indeed, it has been found out that, when the exterior temperature is cold, after the shut-off of the engine, the injection nozzles of these injectors are usually clogged by ammonia salts, so that ammonia cannot be injected into the mixer. At the starting of the engine, the injector is therefore not operational. Several hours are needed before the injection nozzle can be unclogged. Sometimes, the injection nozzle remains clogged and the injector cannot work. In the meantime, the exhaust gas cannot be depolluted.

It is therefore desirable to avoid or at least reduce the formation of clogging in the injection nozzle and/or in the injection line, allowing the injector to be operational rapidly when the engine is started.

SUMMARY

An injector includes an injection line that comprises an upstream pipe fluidically connected to a dosing system, at least one downstream pipe fluidically connected to a respective injection nozzle, and at least one anti-backflow device to avoid or minimize fluidic flow from the at least one or each downstream pipe toward the upstream pipe.

According to specific embodiments of the invention, the injector further presents one or several of the features mentioned below, considered independently or along any technically possible combination:

the anti-backflow device is configured to allow fluidic flow from the upstream pipe toward the downstream pipe;

the anti-backflow device has at least one constriction with a reduced flow-section relatively to the downstream pipe;

the anti-backflow device comprises at least one chicane;

the anti-backflow device comprises a check valve;

the injector comprises a heater to heat the anti-backflow device;

the heater is configured to heat the anti-backflow device during a starting phase of the internal combustion engine; and the upstream pipe is configured to be heated during working phases of the internal combustion engine.

An exhaust line for an internal combustion engine comprises a mixer configured to be crossed by an exhaust gas stream produced by the internal combustion engine and an injector as defined above to inject the reducing agent into said exhaust gas stream.

According to specific embodiments of the invention, the exhaust line further presents one or several of the features mentioned below, considered independently or along any technically possible combination:

the downstream pipe extends from the injection nozzle to the anti-backflow device and comprises an outer portion extending outside the mixer, said outer portion having a length less than 2 m and preferably less than 20 cm;

the anti-backflow device is located inside the mixer; and the exhaust line comprises an exhaust pipe to guide exhaust gas, at least part of the upstream pipe extending close to said exhaust pipe so that the upstream pipe is heated by the exhaust pipe due to exhaust gas flowing through said exhaust pipe.

An automotive vehicle comprises an exhaust line as defined above.

BRIEF DESCRIPTION OF THE DRAWINGS

Other features and advantages of the invention will become apparent from a detailed description which is given thereof below, as an indication and by no means as a limitation, with reference to the appended figures, wherein.

DETAILED DESCRIPTION

Figure 1:
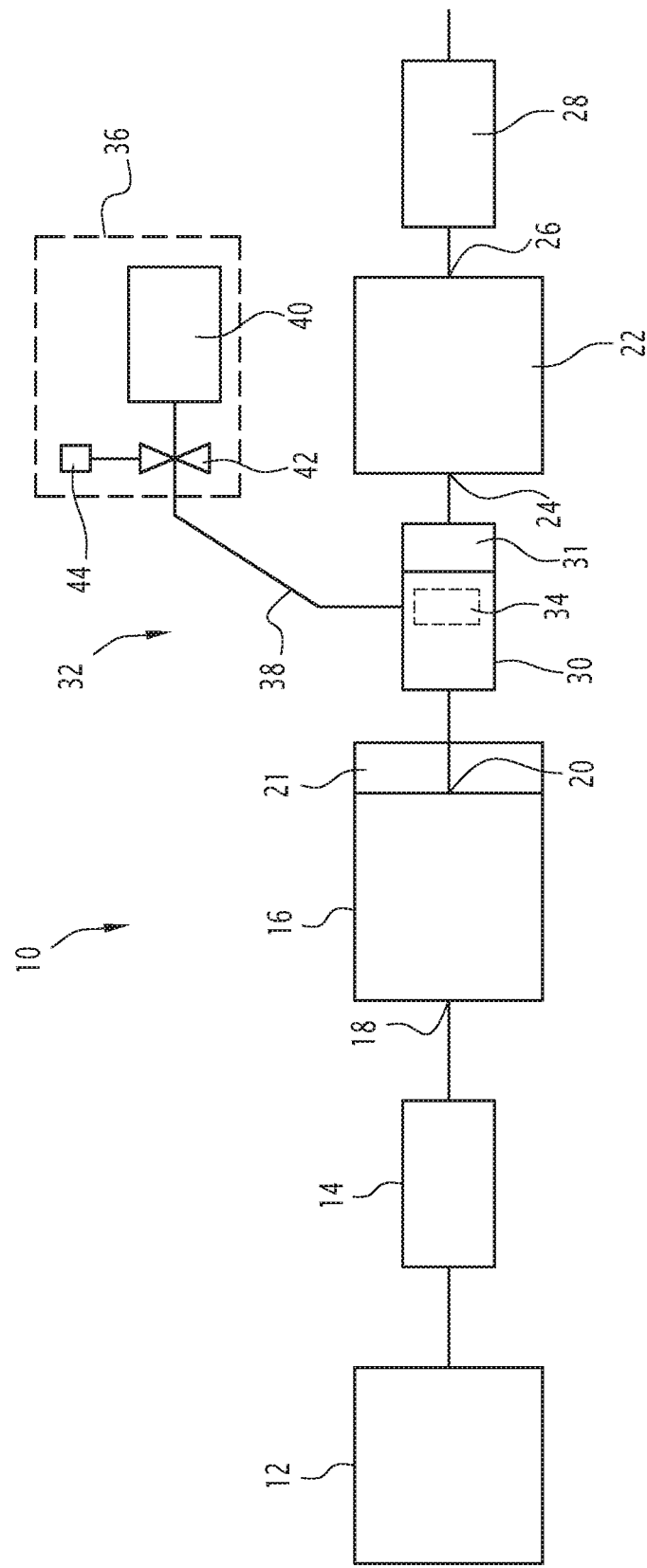
FIG. 1 is a general scheme of an exhaust line according to the invention.

The exhaust line 10 shown in FIG. 1 is part of an automotive vehicle (not shown).

This exhaust line 10 conducts an exhaust gas stream generated by an engine 12 of the automotive vehicle through various upstream exhaust components 14 to reduce emission and control noise as known. The various upstream exhaust components 14 can include one or more of the following: pipes, filters, valves, catalysts, mufflers etc.

In the example configuration, the exhaust line 10 comprises a diesel oxidation catalyst (DOC) 16 having an inlet 18 and an outlet 20 positioned downstream of the upstream exhaust components 14, so that these upstream exhaust components 14 direct engine exhaust gases into the DOC 16.

In the shown example, the exhaust line 10 further comprises a diesel particulate filter (DPF) 21 positioned downstream of the DOC 16. This DPF is able to remove contaminants from the exhaust gas as known.

The exhaust line 10 also comprises a selective catalytic reduction (SCR) catalyst 22 having an inlet 24 and an outlet 26, and downstream exhaust components 28 positioned downstream of the SCR catalyst 22. This SCR catalyst 22 is here positioned downstream of the DOC 16 and of the optional DPF 21.

Optionally, the SCR catalyst 22 can comprise a catalyst that is configured to perform a selective catalytic reduction function and a particulate filter function.

The various downstream exhaust components 28 include for instance one or more of the following: pipes, filters, valves, catalysts, mufflers etc.

The upstream 14 and downstream 28 components can be mounted in various different configurations and combinations dependent upon vehicle application and available packaging space.

The exhaust line 10 further comprises, upstream of the inlet 24 of the SCR catalyst 22, a mixer 30 configured to be crossed by the exhaust gas stream before it enters the SCR catalyst 22. This mixer 30 is here positioned downstream from the outlet 20 of the DOC 16 and of the optional DPF 21.

The mixer 30 is preferably configured to generate a swirling or rotary motion of the exhaust gas stream. Alternatively, the mixer 30 comprises a simple pipe.

The exhaust line 10 also comprises an exhaust pipe 31 for guiding exhaust gas. This exhaust pipe 31 is here shown positioned downstream of the mixer 30, between the mixer 30 and the SCR catalyst 22. Alternatively, the exhaust pipe 31 may form part of the mixer 30 or be positioned upstream of the mixer 30, and/or surround at least partially the DOC 16, the DPF 21 and/or the SCR catalyst 22.

The exhaust line 10 further comprises an injector 32 to inject a gaseous reducing agent into the exhaust gas stream in the mixer 30 so that the mixer 30 can mix the reducing agent and exhaust gas thoroughly together.

The gaseous reducing agent comprises for example ammonia, a mix of air with ammonia, or a mix of ammonia and neutral gas such as helium.

The injector 32 includes an injection nozzle 34 positioned within the mixer 30 to direct injected reducing agent into the mixer 30 to mix with the engine exhaust gas, a dosing system 36 for providing a dosed flow of reducing agent to the injection nozzle 34, and an injection line 38 fluidically connecting the dosing system 36 to the injection nozzle 34.

The dosing system 36 comprises a source of reducing agent 40, a dosing valve 42 for dosing the quantity of reducing agent provided to the injection nozzle 34, and a controller 44 for controlling the dosing valve 32 so as to control dosing of the reducing agent as known.

The source of reducing agent 40 here is an ammonia source. This source typically comprises a tank (not shown) in which gaseous ammonia is stored under pressure. In variant, the source comprises urea or strontium chloride ($SrCl_2$) salts intended to be heated to generate ammonia.

Figure 2:
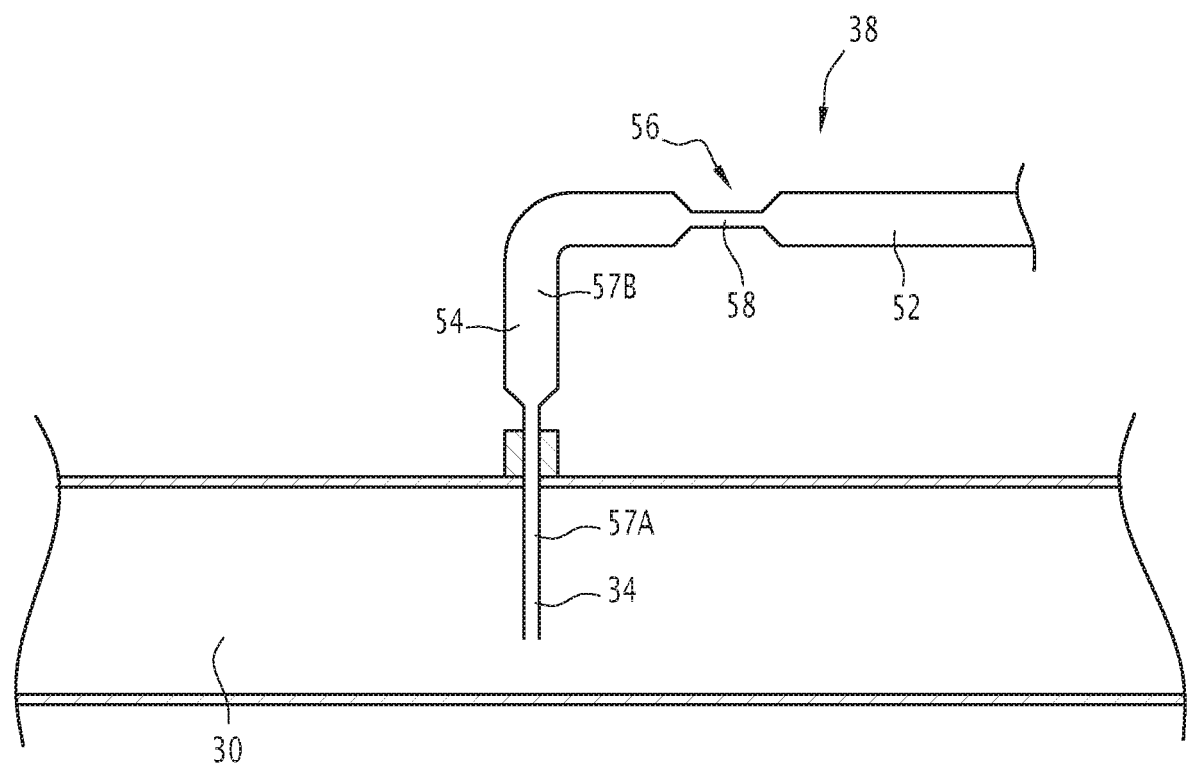
FIG. 2 is a cross-section view of a section of the exhaust line of FIG. 1, according to a first embodiment of the invention.
Figure 3:
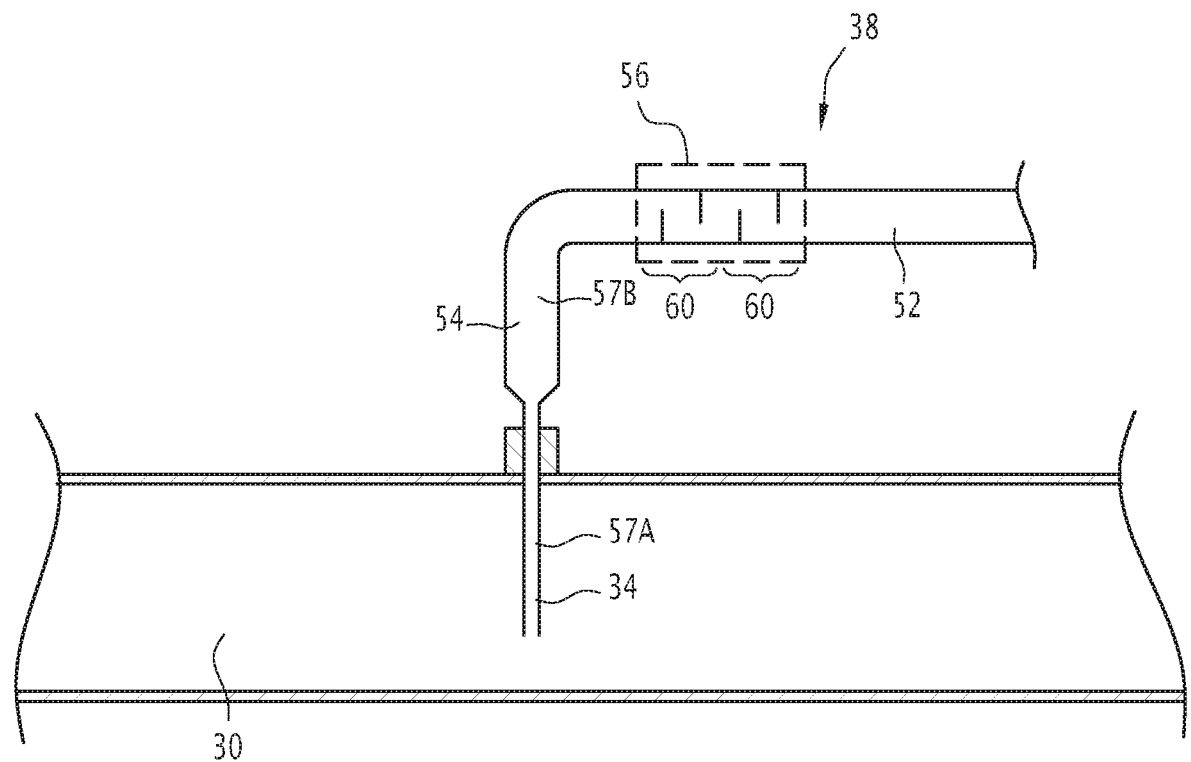
FIG. 3 is a cross-section view of a section of the exhaust line of FIG. 1, according to a second embodiment of the invention.
Figure 4:
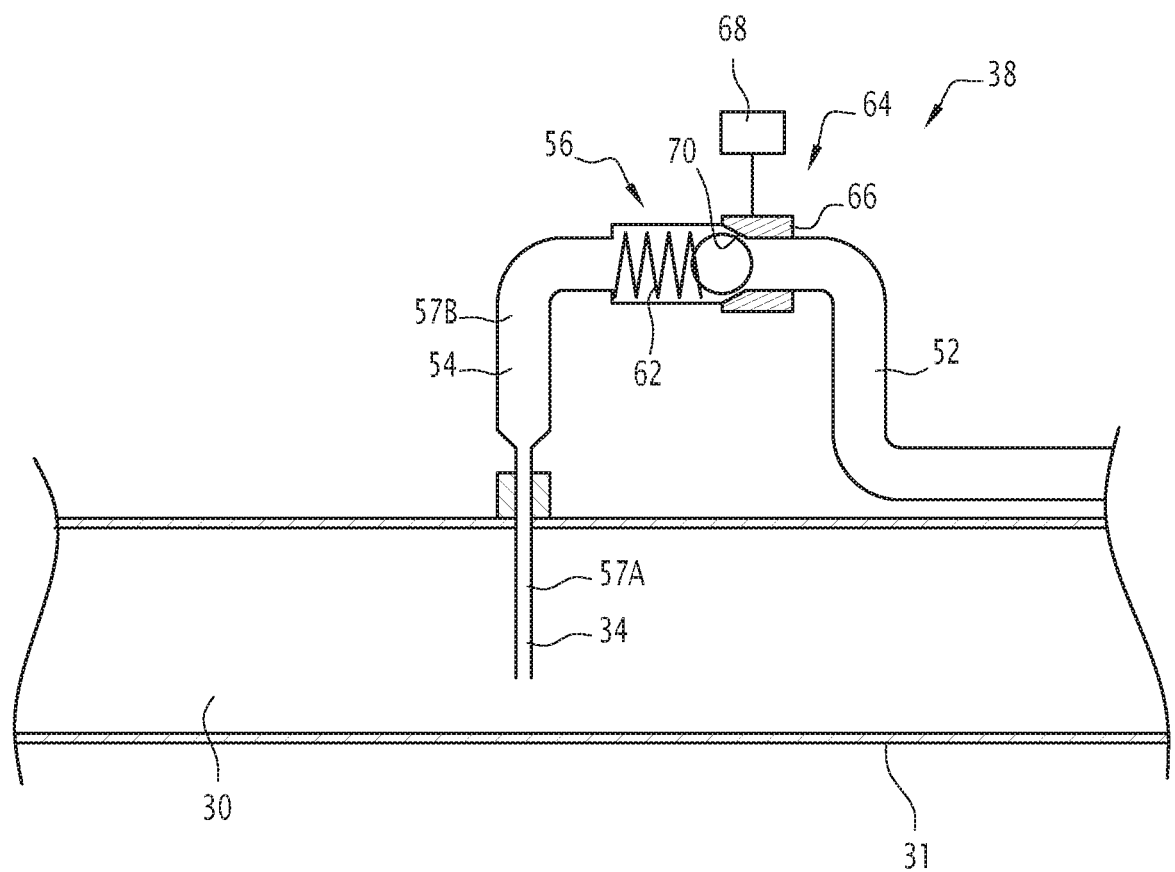
FIG. 4 is a cross-section view of a section of the exhaust line of FIG. 1, according to a third embodiment of the invention.

With reference to FIGS. 2 to 4, the injection line 38 includes an upstream pipe 52 fluidically connected to the dosing system 36, a downstream pipe 54 fluidically connected to the injection nozzle 34, and an anti-backflow device 56 for minimizing fluidic flow from the downstream pipe 54 toward the upstream pipe 52, while allowing fluidic flow from the upstream pipe 52 toward the downstream pipe 54.

It has been surprisingly discovered that this simple feature significantly reduced the risks of the upstream pipe 52 being clogged. As a result thereof, unavailability time of the injector 32 has been significantly reduced in comparison with known ammonia injectors.

The upstream pipe 52 is formed, for instance, by a rigid pipe and/or a flexible hose. Optionally, elements may be added on said rigid pipe and/or a flexible hose.

The upstream pipe 52 preferably extends from the dosing system 36 to the anti-backflow device 56.

The downstream pipe 54 is formed, for instance, by a rigid pipe and/or a flexible hose. Optionally, elements may be added on said rigid pipe and/or a flexible hose.

Preferably, the downstream pipe 54 has substantially the same flow-section as the nozzle 34.

In the shown examples, the downstream pipe 54 extends from the injection nozzle 34 to the anti-backflow device 56.

In the examples of FIGS. 2 to 4, the anti-backflow device 56 is positioned outside the mixer 30. The downstream pipe 54 then comprises an inner portion 57A extending inside the mixer 30 and an outer portion 57B extending outside the mixer 30, the outer portion 57B preferably having a length less than 2 m, for instance less than 20 cm, so that the region of the injection line 38 in which clogging risks occurring is minimized.

The anti-backflow device 56 is preferably integral with the downstream pipe 54 and/or the upstream pipe 52.

In the embodiment of FIG. 2, the anti-backflow device 56 includes at least one constriction 58 of the injection line 38 that has a reduced flow section relatively to the downstream pipe 54. In the shown example, this constriction 58 also has a reduced flow section relatively to the upstream pipe 52.

Preferably, the ratio between the flow section of the downstream pipe 54 and the flow section of the constriction 58 is comprised between 4 and 25, for example 12.

The constriction 58 is, for example, formed by a pinching of the injection line 38 or a shrinking of the injection line 38. Alternatively, the constriction 58 is formed by at least one internal ring disposed inside the injection line 38.

In the embodiment of FIG. 3, the anti-backflow device 56 comprises a portion of the injection line 38 that has several chicanes 60. Here, these chicanes 60 are in the number of two. Alternatively, the anti-backflow device 56 includes three chicanes 60 or more. In another alternative the anti-backflow device 56 includes a single chicane 60.

By "chicane", it is meant a device that impedes the flow path throughout said device by imposing a zigzag course. Such a device is, for instance, a pipe section shaped so that the flow path throughout said pipe section is sinuous, the sinuosity of said flow path being above 1.20, preferably above 1.57.

In the shown example, each chicane 60 defines a constriction in the injection line 38.

In the embodiment of FIG. 4, the anti-backflow device 56 comprises a check valve 62 configured for allowing fluidic flow in a single direction, from the upstream pipe 52 toward the downstream pipe 54. In other words, this check valve 62 is configured for preventing fluidic flow from the downstream pipe 54 toward the upstream pipe 52.

Preferably, as shown in FIG. 4, the injector 32 further comprises an electrical heater 64 for heating the anti-backflow device 56.

This heater 64 is configured to heat the anti-backflow device 56 during a starting phase of the internal combustion engine 12. To that end, the heater 64 comprises an electrical resistance 66 placed close to the anti-backflow device 56 and a controller 68 for providing electrical current to the electrical resistance 66. The controller 68 is configured for detecting a starting phase of the internal combustion engine 12 and providing electrical current to the electrical resistance 66 when such a starting phase has been detected.

In the shown example, the electrical resistance 66 surrounds the anti-backflow device 56 and is in particular positioned around a valve seat 70. Alternatively, the electrical resistance 66 is positioned within the anti-backflow device 56.

This heater 64 allows decomposing salt formed by the reducing agent inside the anti-backflow device 56 that would deteriorate the sealing performance of the check valve 62 and/or would clog the injection line 38, and thus prevents such a deterioration of the sealing performance or clogging of the injection line 38 from occurring.

Also, in the embodiment of FIG. 4, the upstream pipe 52 is configured to be heated during working phases of the internal combustion engine 12. To that end, a substantial part of the upstream pipe 52 extends close to the exhaust pipe 31 so that the upstream pipe 52 is heated by the exhaust pipe 31 due to exhaust gas flowing through said exhaust pipe 31. By "heated", it is meant that said part of the upstream pipe 52 is positioned relatively to the exhaust pipe 31 so as to receive a radiated thermal power of at least 0.1 W per linear meter of upstream pipe 52 from the exhaust pipe 31 when exhaust gas flows through the pipe 31 is at a temperature above 120° C., said radiated thermal power being preferably more than 2 W per linear meter of upstream pipe 52. This radiated thermal power is typically calculated using the Stefan-Boltzmann law, for instance with the help of a thermal calculation software such as TAITherm of ThermoAnalytics®.

The appropriate position of the part of the upstream pipe 52 in relation to the exhaust pipe 31 so that such a heating may be provided depends on several factors, including the thermal isolation of the exhaust pipe 31. The skilled person will be able to determine this appropriate position without any difficulty, using for instance Computer Assisted Design.

Figure 5:
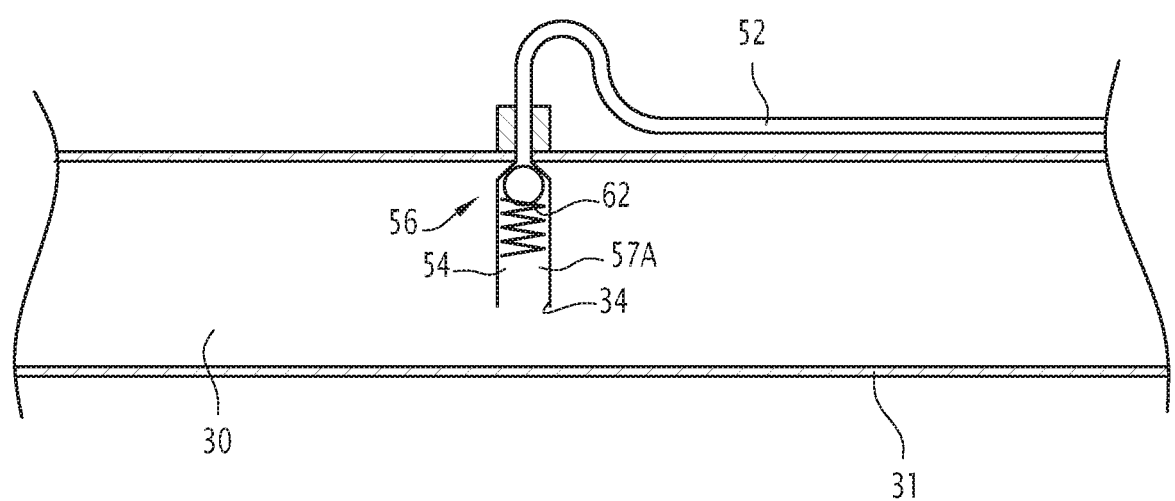
FIG. 5 is a cross-section view of a section of the exhaust line of FIG. 1, according to a fourth embodiment of the invention.

The embodiment of FIG. 5 differs from the one of FIG. 4 in that the anti-backflow device 56 is positioned inside the mixer 30. The downstream pipe 54 then is comprised of its inner portion 57A and does not comprise any outer portion.

Also, the check valve 62 is made of a material that is resistant to high temperatures (higher than 500° C.).

Another difference is that, in this fourth embodiment, the injector 32 does not comprise any electrical heater for heating the anti-backflow device 62.

Thanks to the invention mentioned above, clogging of the injector 32 is prevented or at least significantly reduced. As a result thereof, unavailability time of the injector 32 is reduced.

Although features of the invention have been disclosed in several embodiments, it is to be understood that these embodiments may be combined to each other, and that the invention also extends to these combinations. For instance, the anti-backflow device 56 may comprise simultaneously a constriction, at least one chicane, and a check valve. Also, the upstream pipe 52 of the embodiments of FIGS. 2 and 3 may be configured to be heated during working phases of the internal combustion engine 12 in the same manner as the upstream pipe 52 of the embodiment of FIG. 5 is.

Also, even though the injector 32 described here comprises a single injection nozzle 34, the invention is not limited to this single embodiment. In alternatives (not shown) of the invention, the injector 32 comprises several injection nozzles 34, each nozzle 34 then being connected to the anti-backflow device 56 by a respective downstream pipe 54.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An injector for injecting a gaseous reducing agent into an exhaust gas stream of an internal combustion engine, the injector comprising:
   at least one injection nozzle;
   a dosing system to provide a dosed flow of reducing agent to the at least one or each injection nozzle; and
   an injection line fluidically connecting the dosing system to the at least one or each injection nozzle, wherein the injection line comprises an upstream pipe fluidically connected to the dosing system, at least one downstream pipe fluidically connected to a respective injection nozzle, and at least one anti-backflow device to avoid or minimize fluidic flow from the at least one or each downstream pipe toward the upstream pipe, and wherein the at least one anti-backflow device has at least one constriction with a reduced flow-section relative to the at least one downstream pipe, and wherein a ratio between a flow section of the at least one downstream pipe and a flow section of the at least one constriction is comprised between 4 and 25.

2. The injector of claim 1, wherein the at least one anti-backflow device is configured to allow fluidic flow from the upstream pipe toward the at least one downstream pipe.

3. The injector of claim 1, wherein the at least one constriction has a reduced flow-section relative to the upstream pipe and comprises a pinched pipe section that connects the at least one downstream pipe and the upstream pipe.

4. The injector of claim 1, wherein the at least one anti-backflow device comprises at least one chicane.

5. The injector of claim 1, wherein the upstream pipe is configured to be heated during working phases of the internal combustion engine.

6. The injector of claim 1, wherein the at least one anti-backflow device comprises at least one chicane that is located internally within the injection line so that a flow path internally within the injection line is sinuous.

7. The injector of claim 1, comprising a heater to heat the at least one anti-backflow device.

8. The injector of claim 7, wherein the heater is configured to heat the at least one anti-backflow device during a starting phase of the internal combustion engine.

9. An exhaust line for an internal combustion engine comprising:
a mixer configured to be crossed by an exhaust gas stream produced by the internal combustion engine;
an injector to inject a reducing agent into said exhaust gas stream, the injector comprising at least one injection nozzle;
a dosing system to provide a dosed flow of the reducing agent to the or each injection nozzle; and
an injection line fluidically connecting the dosing system to the at least one or each injection nozzle, wherein the injection line comprises an upstream pipe fluidically connected to the dosing system, at least one downstream pipe fluidically connected to a respective injection nozzle, and at least one anti-backflow device to avoid or minimize fluidic flow from the at least one or each downstream pipe toward the upstream pipe, and wherein the at least one anti-backflow device has at least one constriction that comprises a reduced flow-section relative to the at least one downstream pipe, and/or comprises at least one chicane that is located internally within the injection line, and wherein a ratio between a flow section of the at least one downstream pipe and a flow section of the at least one constriction is comprised between 4 and 25.

10. The exhaust line of claim 9, wherein the at least one downstream pipe extends from the at least one injection nozzle to the at least one anti-backflow device and comprises an outer portion extending outside the mixer, said outer portion having a length that is less than 2 m.

11. The exhaust line of claim 9, wherein the at least one downstream pipe extends from the at least one injection nozzle to the at least one anti-backflow device and comprises an outer portion extending outside the mixer, said outer portion having a length that is less than 20 cm.

12. The exhaust line of claim 9, wherein the at least one anti-backflow device is located inside the mixer.

13. The exhaust line of anyone of claim 9, comprising an exhaust pipe to guide exhaust gas, at least part of the upstream pipe extending close to said exhaust pipe so that the upstream pipe is heated by the exhaust pipe due to exhaust gas flowing through said exhaust pipe.

14. The exhaust line of claim 9, wherein the at least one constriction has a reduced flow-section relative to the at least one downstream pipe and the upstream pipe, and wherein the at least one constriction comprises a pinched pipe section that connects the at least one downstream pipe and the upstream pipe.

15. The exhaust line of claim 9, wherein the at least one constriction comprises at least one chicane that is located internally within the injection line so that a flow path internally within the injection line is sinuous.

16. An automotive vehicle comprising:
an exhaust line for an internal combustion engine comprising a mixer configured to be crossed by an exhaust gas stream produced by the internal combustion engine;
an injector to inject a reducing agent into said exhaust gas stream, the injector comprising at least one injection nozzle;
a dosing system to provide a dosed flow of the reducing agent to the at least one or each injection nozzle; and
an injection line fluidically connecting the dosing system to the at least one or each injection nozzle, wherein the injection line comprises an upstream pipe fluidically connected to the dosing system, at least one downstream pipe fluidically connected to a respective injection nozzle, and at least one anti-backflow device to avoid or minimize fluidic flow from the at least one or each downstream pipe toward the upstream pipe, and wherein the at least one anti-backflow device has at least one constriction that comprises a reduced flow-section relative to the at least one downstream pipe, and/or comprises at least one chicane that is located internally within the injection line, and wherein a ratio between a flow section of the at least one downstream pipe and a flow section of the at least one constriction is comprised between 4 and 25.

17. The automotive vehicle of claim 16, wherein the at least one constriction has a reduced flow-section relative to the at least one downstream pipe and the upstream pipe, and wherein the at least one constriction comprises a pinched pipe section that connects the at least one downstream pipe and the upstream pipe.

18. The automotive vehicle of claim 16, wherein the at least one constriction comprises at least one chicane that is located internally within the injection line so that a flow path internally within the injection line is sinuous.

* * * * *